(12) United States Patent
Hagiwara et al.

(10) Patent No.: US 10,053,122 B2
(45) Date of Patent: Aug. 21, 2018

(54) TRAIN-RUNNING MANAGEMENT DEVICE

(71) Applicant: MITSUBISHI ELECTRIC CORPORATION, Chiyoda-ku, Tokyo (JP)

(72) Inventors: Masashi Hagiwara, Tokyo (JP); Yusaku Nagasaki, Tokyo (JP); Koki Yoshimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 110 days.

(21) Appl. No.: 15/115,363

(22) PCT Filed: Feb. 7, 2014

(86) PCT No.: PCT/JP2014/052963
§ 371 (c)(1),
(2) Date: Jul. 29, 2016

(87) PCT Pub. No.: WO2015/118671
PCT Pub. Date: Aug. 13, 2015

(65) Prior Publication Data
US 2017/0008542 A1    Jan. 12, 2017

(51) Int. Cl.
*B61L 27/00* (2006.01)
*B60L 15/40* (2006.01)
*B61L 23/18* (2006.01)
*B61L 25/02* (2006.01)

(52) U.S. Cl.
CPC ........... *B61L 27/0027* (2013.01); *B60L 15/40* (2013.01); *B61L 23/18* (2013.01); *B61L 25/021* (2013.01); *B61L 25/025* (2013.01); *B61L 27/0077* (2013.01); *B61L 2201/00* (2013.01)

(58) Field of Classification Search
CPC ...... B61L 3/006; B61L 27/0027; B61L 3/008; B61L 25/021; B61L 25/025; B61L 27/0022; B61L 27/04; B60L 2200/26; B60L 2240/12; B60L 2250/16; B60L 2260/32
See application file for complete search history.

(56) References Cited

FOREIGN PATENT DOCUMENTS

| EP | 0 539 885 B1 | 4/1997 |
|---|---|---|
| JP | 05193502 A | 8/1993 |
| JP | 06-153327 A | 5/1994 |
| JP | 06-171513 A | 6/1994 |
| JP | 07327302 A | 12/1995 |
| JP | 2002-204507 A | 7/2002 |
| JP | 2002-330502 A | 11/2002 |
| JP | 2003-095109 A | 4/2003 |

(Continued)

OTHER PUBLICATIONS

International Search Report (PCT/ISA/210) dated Apr. 28, 2014, by the Japanese Patent Office as the International Searching Authority for International Application No. PCT/JP2014/052963.

(Continued)

*Primary Examiner* — Jelani A Smith
(74) *Attorney, Agent, or Firm* — Buchanan Ingersoll & Rooney PC

(57) ABSTRACT

When it is determined that a control-target train has an impact on a third train that is other than a train that is determined to affect the control-target train, a ground running control unit of a train-running management device further changes a running pattern and instructs the control-target train to take less time to completely leave a departure station.

3 Claims, 5 Drawing Sheets

(56) References Cited

FOREIGN PATENT DOCUMENTS

| JP | 2010-228688 A | 10/2010 |
| JP | 2011-131636 A | 7/2011 |
| JP | 2013-241101 A | 12/2013 |

OTHER PUBLICATIONS

Written Opinion (PCT/ISA/237) dated Apr. 28, 2014, by the Japanese Patent Office as the International Searching Authority for International Application No. PCT/JP2014/052963.

Office Action (Notice of Rejection) dated Mar. 8, 2016, by the Japanese Patent Office in corresponding Japanese Patent Application No. 2015-561124, and an English Translation of the Office Action.

Xu et al., "Research on Speed Control Algorithm of Automatic Train Operation in Urban Transit," Railway Computer Application, (Nov. 30, 2012), vol. 21, No. 11, pp. 50-53. (which include an English abstract).

Office Action dated Apr. 17, 2017, by the Chinese Patent Office in corresponding Chinese Patent Application No. 201480074835.X, and an English Translation of the Office Action. (9 pages).

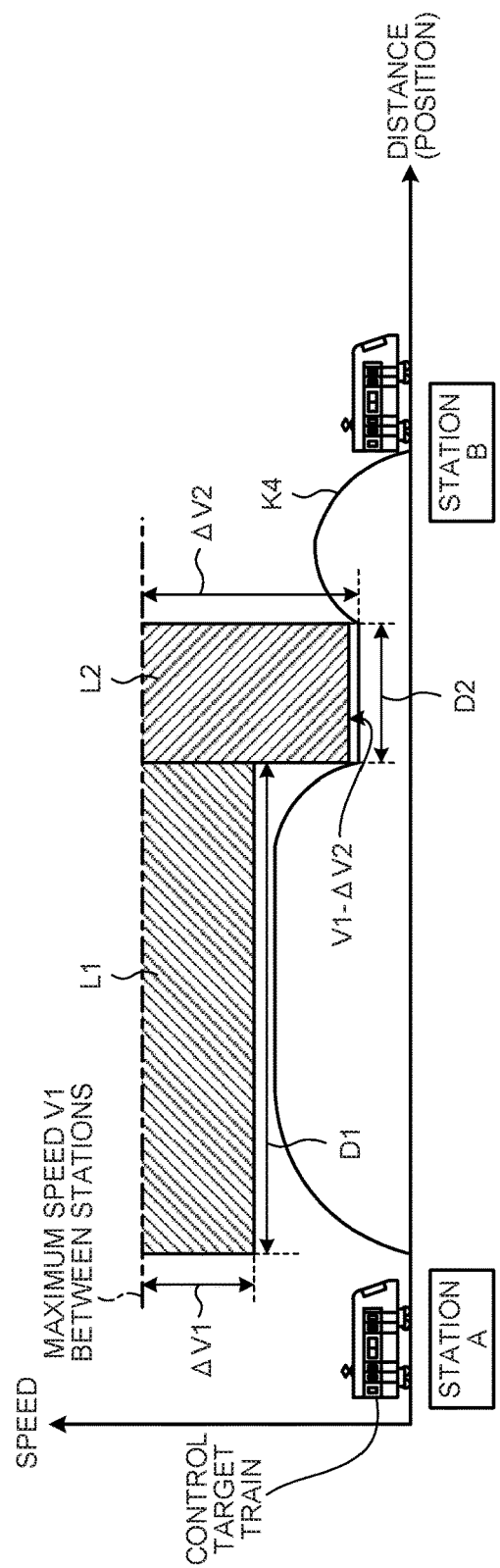

TRAIN-RUNNING MANAGEMENT DEVICE

FIELD

The present invention relates to a train-running management device.

BACKGROUND

The train-running management device disclosed in Patent Literature 1 listed below is an example of a conventional technique in which, a running curve for controlling the speed of a train is recreated in accordance with the occurrence of any delay of a preceding train such that the train is caused to run according to the recreated running curve.

If the preceding train causes a delay, the train approaches the preceding train and a speed limit is applied to the train. As a result, the arrival of the train at the next station is delayed. It is further disclosed in Patent Literature 1 that, by adjusting the speed of the train beforehand depending on the status of the preceding train, the train's arrival time punctuality at the next station is improved.

CITATION LIST

Patent Literature

Patent Literature 1: Japanese Patent Application Laid-open No. H6-171513

SUMMARY

Technical Problem

However, with the conventional technique described above, consideration is not given to the running conditions of a train subsequent to the train (hereinafter, a "control-target train") or insufficient consideration is given to the running conditions. When a group of trains that include other trains running on the line are considered, the arrival time punctuality of a group of subsequent trains located behind the control-target train is not necessarily improved even when the arrival time punctuality of the control-target train is improved, and thus the conventional technique is not effective in suppressing delay propagation that can occur in the manner of a chain reaction in the group of subsequent trains.

The present invention has been achieved in view of the above problems, and an object of the present invention is to provide a train-running management device that can suppress delay propagation of the train arrival time that can occur in the manner of a chain reaction in the group of subsequent trains.

Solution to Problem

In order to solve the above problems and achieve the object, an aspect of the present invention provides a train-running management device including a ground running control unit that transmits a running pattern or information contributing to the generation of the running pattern to a control-target train. The ground running control unit regards the control-target train, a preceding train located ahead of the control-target train, and a subsequent train approaching from behind the control-target train as one group, and changes the running pattern that is instructed to the control-target train to control such that the control-target train decelerates considerably after running at a high speed immediately after departure, when it is determined that the control-target train affects the subsequent train.

Advantageous Effects of Invention

According to the present invention, an effect is obtained where it is possible to suppress delay propagation of the train arrival time that can occur in the manner of a chain reaction in the group of subsequent trains.

BRIEF DESCRIPTION OF DRAWINGS

FIG. 6 is an explanatory diagram of a method for acquiring the running pattern described in the first embodiment on the in-vehicle side by transmitting limiting speed information to the train side.

DESCRIPTION OF EMBODIMENTS

A train-running management device according to embodiments of the present invention will be explained below in detail with reference to the accompanying drawings. The present invention is not limited to the following embodiments.

First embodiment

Figure 1:
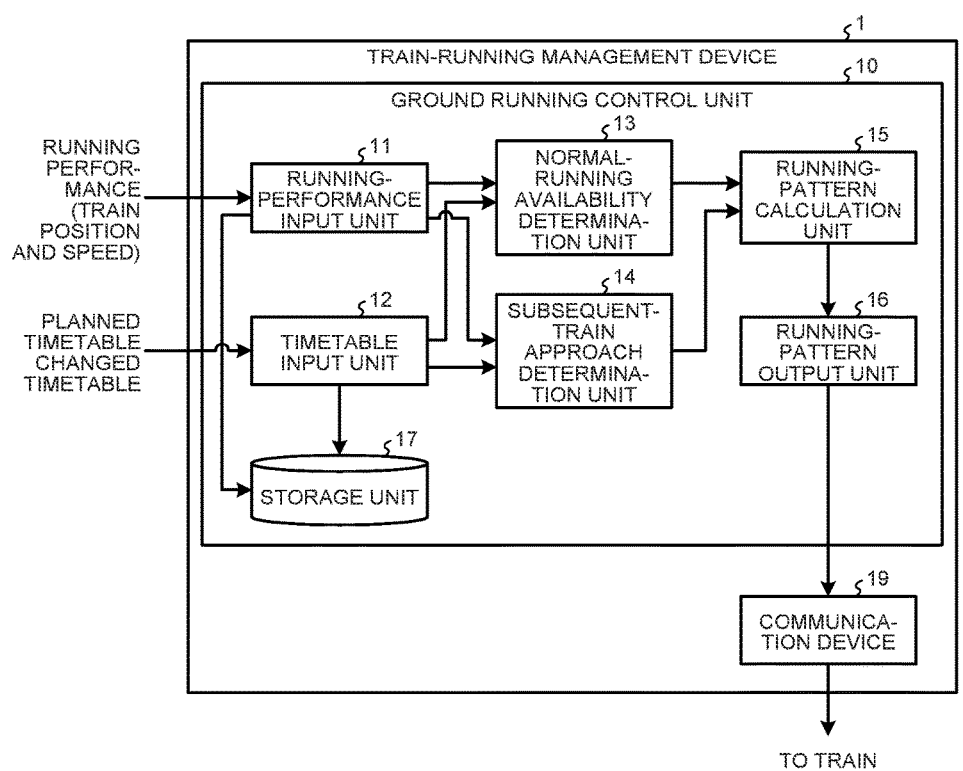
FIG. 1 is a functional block diagram illustrating a configuration of a train-running management device according to a first embodiment.

FIG. 1 is a functional block diagram illustrating the configuration of a train-running management device according to a first embodiment. A train-running management device 1 according to the first embodiment includes, as illustrated in FIG. 1, a ground running control unit 10 and a communication device 19. The ground running control unit 10 has a function of appropriately correcting a running pattern (also a "running curve") of a control-target train according to the train intervals between three trains (typical examples are a preceding train, the control-target train, and a subsequent train) that mutually affect each other's operation, i.e., the interval between the preceding train and the control-target train and the interval between the control-target train and the subsequent train, and issuing the corrected running pattern or information contributing to the generation of the corrected running pattern to an automatic train operation (hereinafter, ATO) mounted on the control-target train via the communication device 19.

The three trains, i.e., the preceding train, the control-target train, and the subsequent train, are grouped in such a relation that the trains are shifted one by one, as viewed from the entire train group. For example, in a case where the trains are running in order of a train A, a train B, a train C, and a train D in an advancing direction, when the train B is the control-target train, then the train A is the preceding train and the train C is the subsequent train. When the train C is the control-target train, then the train B is the preceding train and the train D is the subsequent train. The present embodiment is not limited to these relations and, for example, a train (a train E) crossing a railroad switch and coming into a branching line, i.e., the train E that is in an interference relation, is also included in the train group. The train E is a train that affects running of the train A, and it corresponds to the preceding train when viewed from the train A.

With reference back to FIG. 1, the internal configuration of the ground running control unit 10 is described. The ground running control unit 10 is configured to include, as illustrated in FIG. 1, a running-performance input unit 11, a timetable input unit 12, a normal-running availability determination unit 13, a subsequent-train approach determination unit 14, a running-pattern calculation unit 15, a running-pattern output unit 16, and a storage unit 17.

The running-performance input unit 11 receives an input of information on running performance related to the position, speed, and the like of a train. The running performance can include, not only information on the time when a train stops at a certain station and information on which station a train is now stopping, but also detailed position and speed information such as information indicating where a train is running at what time in hours and minutes and information on the speed at that time. The running performance can also include prediction of the position and speed and the train arrival and departure times in the future created on the basis of the detailed position and speed information. The timetable input unit 12 receives an input of timetable information including a planned timetable and a changed timetable. The changed timetable is a corrected timetable that is corrected in accordance with disruption to the planned timetable. The pieces of information input to the running-performance input unit 11 and the timetable input unit 12 are held in the storage unit 17 so that other processing units such as the running-pattern calculation unit 15 can refer to the information. In the present embodiment, there are two input units: the running-performance input unit 11 and the timetable input unit 12; however, these input units can be integrated as one input unit.

The pieces of information input to the running-performance input unit 11 and the timetable input unit 12 are respectively input to the normal-running availability determination unit 13 and the subsequent-train approach determination unit 14. The normal-running availability determination unit 13 determines whether the control-target train can run normally, i.e., can run according to a running pattern at the time of normal running, and inputs the determination result to the running-pattern calculation unit 15. With regard to a method for determining whether the control-target train is affected by a preceding train and correcting the running curve according to the determination result, there are many known literatures including the Patent Literature 1 described above, and thus detailed descriptions thereof are omitted here.

The subsequent-train approach determination unit 14 determines the approach of the subsequent train and inputs the determination result to the running-pattern calculation unit 15. The determination of whether the subsequent train is approaching is performed generally by using information on the position relation between the control-target train and the subsequent train, speed information on the control-target train and the subsequent train, and the like. When real-time information on the position relation and the speeds cannot be acquired, the determination can be realized by using the running performance and the future prediction information. In the present embodiment, the ground running control unit 10 includes the two determination units: the normal-running availability determination unit 13 and the subsequent-train approach determination unit 14; however, these determination units can be integrated into one determination unit.

The running-pattern calculation unit 15 calculates the running pattern on the basis of the determination results by the normal-running availability determination unit 13 and the subsequent-train approach determination unit 14. A method for generating the running pattern is described later.

The running-pattern output unit 16 outputs the running pattern generated by the running-pattern calculation unit 15 or the information contributing to the generation of the running pattern to the communication device 19. The communication device 19 transmits the running pattern or the information contributing to the generation of the running pattern to the ATO mounted on the control-target train as described above. Equivalent effects can also be acquired by displaying the running pattern in the cab and causing a driver to perform a following operation instead of using the ATO.

When speed limit information is to be used as in a second embodiment described later, an automatic train control (ATC) can be used for transmitting the speed limit information to the train.

Figure 2:
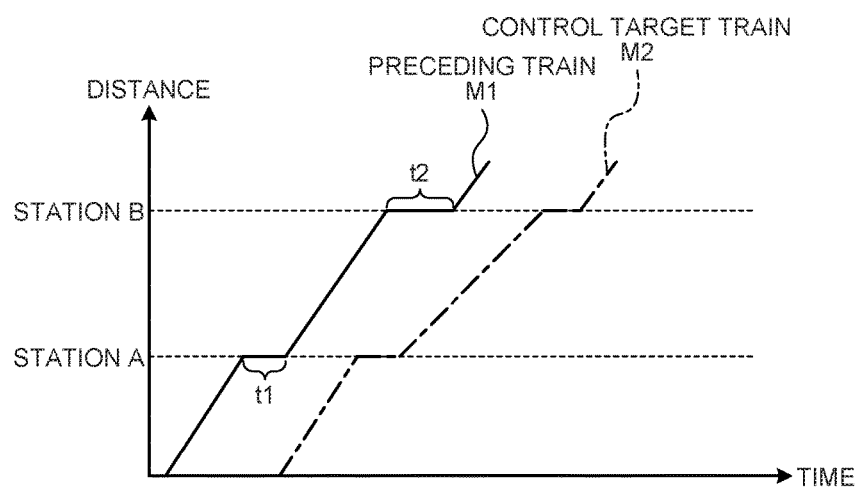
FIG. 2 is an explanatory diagram of the impact of the delay of a preceding train on a control-target train.

FIG. 2 is an explanatory diagram of the impact of the delay of a preceding train on the control-target train. FIG. 2 illustrates the status with a timetable diagram (running path of preceding train: M1, running path of control-target train: M2). As illustrated in FIG. 2, when a stop time t2 at a station B becomes longer than a stop time t1 (a normal stop time) at a station A (t2>t1), the control-target train is affected by a stop delay time (t2−t1) of the preceding train at the station B, and it needs to wait before the station B until the preceding train leaves the station B. Therefore, it becomes necessary for the control-target train to decelerate, which is not required normally, or in an extreme case, to stop before the station B (hereinafter, to stop between stations is referred to as an "abnormal stop"). In a section between the station A and the station B, the train may run while decelerating beforehand in order to avoid the abnormal stop. Patent Literature 1 described above basically employs this method to execute speed control of a control-target train.

Figure 3:
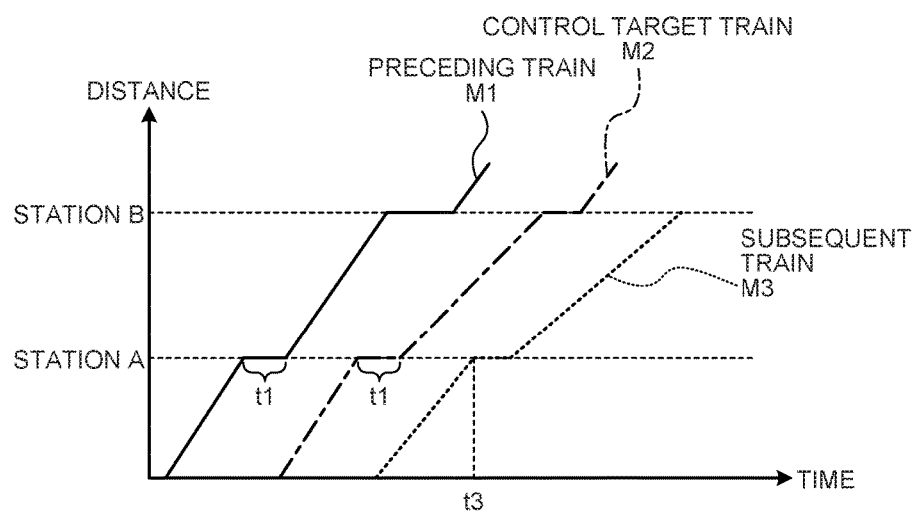
FIG. 3 is an explanatory diagram of the impact of the delay of a control-target train caused by the delay of a preceding train on a subsequent train.

FIG. 3 is an explanatory diagram of the impact of the delay of a control-target train caused by the delay of a preceding train on a subsequent train, where a train running path M3 of the affected subsequent train is illustrated in addition to the running paths M1 and M2 illustrated in FIG. 2.

A speed limit is applied to the running path M2 of the control-target train between the station A and the station B due to the delay of the preceding train at the station B. Due to the impact thereof, a time t3 at which the control-target train has completely passed through the station A and the subsequent train can enter the station A is delayed. Due to a further impact thereof, it is assumed that a state exists where the subsequent train needs to run while decelerating more in order to avoid the abnormal stop (the running path M3).

As described above, with the running pattern control of a control-target train using the conventional technique, there is a large possibility of causing delay propagation over the entire train group due to a state where train delays occur in the manner of a chain reaction.

Figure 4:
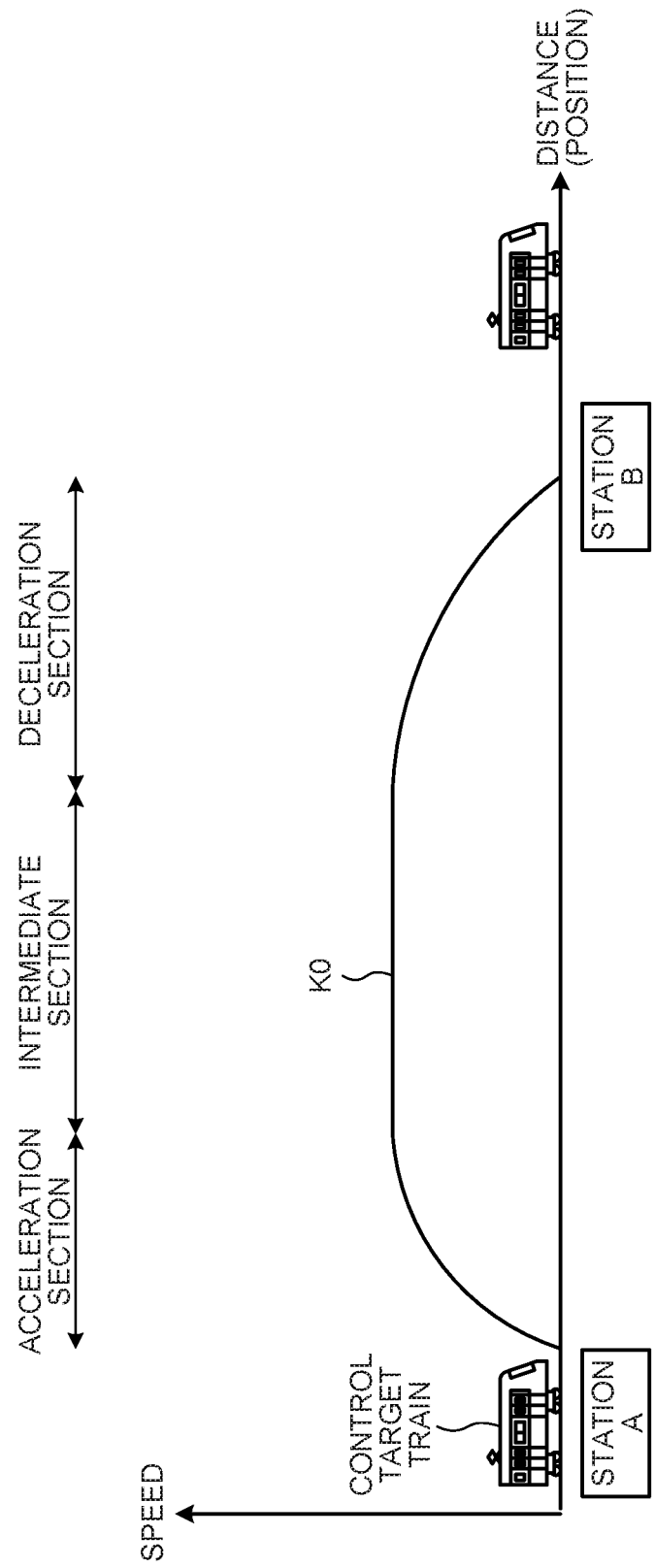
FIG. 4 is a diagram illustrating a running pattern when a control-target train runs without being affected by a preceding train and a subsequent train.

FIG. 4 is a diagram illustrating a running pattern when a control-target train runs without being affected by a preceding train and a subsequent train. The running pattern is generally represented, as illustrated in FIG. 4, by plotting the distance (or the position) on the horizontal axis and the speed on the vertical axis. Also in the present application, a curve represented by this relation is referred to as a "running pattern".

A running pattern K0 can be divided into three sections for descriptive purposes: an acceleration section where a train accelerates, a deceleration section where a train decelerates, and an intermediate section between the acceleration section and the deceleration section.

Figure 5:
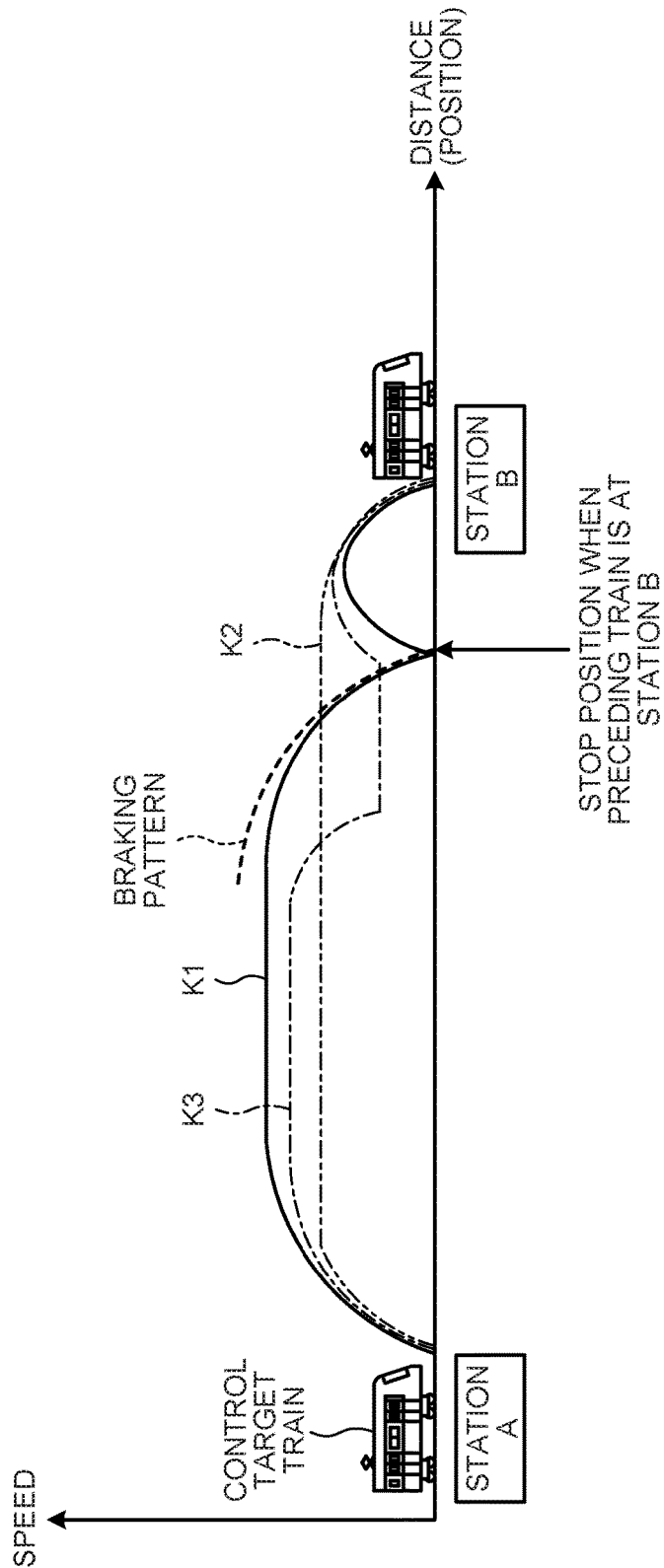
FIG. 5 is an explanatory diagram of a running pattern calculated by the train-running management device according to the first embodiment in comparison with a running pattern created using a conventional technique.

FIG. 5 is an explanatory diagram of a running pattern calculated by the train-running management device according to the first embodiment in comparison with a running pattern created using the conventional technique. In FIG. 5, a running pattern K1 indicated by a solid line is a pattern when a control-target train runs without taking the impact of a preceding train and a subsequent train into consideration at the time when the preceding train delays. The stop position of the control-target train is before the station B while the preceding train is still at the station B. A speed-position curve corresponding to the brake performance to enable the control-target train to stop at the stop position is referred to as a "braking pattern" and indicated by a dashed line in FIG. 5. When the position or speed of the control-target train exceeds the braking pattern, the brake is applied automatically. When the preceding train has completely left the station B, the braking pattern moves forward so that the control-target train can enter the station B. In the running pattern K1, the control-target train stops once according to the braking pattern and, after the braking pattern disappears, accelerates again toward the station B.

A running pattern K2 indicated by a two-dot chain line is a running pattern in which the impact of the delay of the preceding train is avoided while the impact on the subsequent train is not taken into consideration. The control-target train runs slowly in advance so as to avoid the braking pattern.

A running pattern K3 indicated by a dot-and-dash line is a running pattern in which the impact of the delay of the preceding train is avoided and the impact on the subsequent train is suppressed when the subsequent train is approaching. The running pattern K3 is characterized as a curve having a shape such that the control-target train runs at a high speed immediately after departure and considerably decelerates thereafter (an inverse S shape) as illustrated in FIG. 5.

When the characteristics of the running pattern K3 are compared with those of the running pattern K2, the speed in the running pattern K3 is higher than that in the running pattern K2 from the acceleration section to the first half of the intermediate section. In contrast, from the second half of the intermediate section to the deceleration section, the speed in the running pattern K2 is higher than that in the running pattern K3.

When the running pattern K3 is used, the control-target train can pull away from the departure station as quickly as possible. Therefore, the impact on the subsequent train can be reduced, thereby enabling the suppression of the delay propagation over the entire group of subsequent trains.

The characteristics of the running pattern having the inverse S shape are that it is a method of not only avoiding the impact of the preceding train but also taking into consideration reduction of the impact on the subsequent train, in a case where there is an impact on both the preceding train and the subsequent train, and it is an original method that cannot be seen in the conventional method. It can be considered that use of this method increases the impact from the preceding train. However, when the preceding train, the control-target train, and the subsequent train are viewed as one group, the preceding train is the control-target train in an adjacent group on the rear side, and running control is executed so as to reduce the impact on the group of subsequent trains located behind the control-target train. Therefore, it becomes possible to suppress delay propagation over the entire group of subsequent trains.

By using the running patterns K0, K2, and K3 together, such an effect can be obtained that when the subsequent train is not approaching, a running pattern is created by taking only the relation with the preceding train into consideration, thereby enabling the adjustment of energy saving, the ride quality, and the like at a high level. When the subsequent train is approaching, such an effect can be obtained that the delay propagation over the entire train group can be suppressed. That is, according to the train-running management device of the first embodiment, by suppressing unwanted acceleration or deceleration and abnormal stop while suppressing delay propagation to the group of subsequent trains, energy saving and improvement of the ride quality can be improved or maintained.

As described above, according to the train-running management device of the first embodiment, a control-target train, a preceding train located ahead of the control-target train, and a subsequent train approaching from behind the control-target train are regarded as one group, and the relation among the preceding train, control-target train, and subsequent train is managed by shifting the trains one by one. When it is determined that the control-target train is affected by the subsequent train, the running pattern of the control-target train in the acceleration section and the intermediate section is changed and the control-target train is instructed to run at a high speed immediately after departure and decelerate considerably thereafter. Accordingly, such an effect can be obtained that delay propagation of the train arrival time that can occur in the manner of a chain reaction in the group of subsequent trains can be suppressed.

In the first embodiment, a description has been given of a case where the running-pattern calculation unit 15 generates the running pattern by arithmetic processing. However, the closeness of a preceding train and a subsequent train and various running patterns corresponding to the target running time of the control-target train can be calculated beforehand in an off-line mode, processed into a database, and stored in the storage unit 17. By doing such processing, the time required for the arithmetic processing can be reduced and quick and timely train control can be realized.

Second embodiment

In order to transmit a detailed running pattern created on the ground to an in-vehicle device (ATO) of a train so that the train runs according to the running pattern, a complicated communication procedure and complicated functions of the in-vehicle device are necessary. In the first embodiment, the premise is that the running pattern is transmitted. In the second embodiment, an embodiment in which limiting speed information is transmitted to a control-target train instead of transmitting the detailed running pattern is described. A train-running management device according to the second embodiment has an identical or equivalent configuration to that illustrated in FIG. 1.

When a digital ATC is used as a signal system, the limiting speed information can be added to an ATC message. Further, an existing ATO automatically decelerates so as to maintain the limiting speed provided from the ATC. Therefore, by adding the limiting speed information, the running pattern can be controlled.

FIG. 6 is an explanatory diagram of a method for acquiring a running pattern described in the first embodiment on the in-vehicle side by transmitting the limiting speed information to the control-target train. In FIG. 6, a running pattern K4 indicated by a solid line is equivalent to the running pattern K3 illustrated in FIG. 5. Further, a straight line indicated by a dot-and-dash line represents the maximum speed over a running line (maximum speed between stations: V1).

In FIG. 6, two hatched regions (L1, L2) are illustrated. The region L1 indicates that the limiting speed is V1-ΔV1 and that the distance over which the limiting speed is applied is Dl. The region L2 indicates that the limiting speed is V1-ΔV2 and that the distance over which the limiting speed is applied is D2.

By transmitting the two pieces of limiting speed information indicated by the concept of the regions L1 and L2 to the control-target train, the train can draw the running pattern K4. More specifically, because the limiting speed is V1-ΔV1, the control-target train accelerates toward the limiting speed V1-ΔV1. After running within the limiting speed V1-ΔV1, the control-target train decelerates according to the limiting speed V1-ΔV2. After the cancellation point of the limiting speed V1-ΔV2, the control-target train accelerates again. In this manner, the running pattern K4 equivalent to the running pattern K3 illustrated in FIG. 5 can be acquired.

In FIG. 6, the method for acquiring the running pattern K3 in the inverse S shape illustrated in FIG. 5 by using the two pieces of limiting speed information has been described. However, the running pattern K3 can be acquired by using one piece of limiting speed information, or three or more pieces thereof. By increasing the number of pieces of limiting speed information, a smoother running pattern can be acquired, thereby enabling the energy saving effect to be enhanced and the ride quality to be improved.

As described above, according to the train-running management device of the second embodiment, at least two pieces of limiting speed information are transmitted to the control-target train as information contributing to the generation of the running pattern. Accordingly, an effect is obtained where the system can be constructed without installing a new communication unit and without modifying the ATO.

The configurations described in the above first and second embodiments are merely exemplary configurations of the present invention. The configurations can be combined with other publicly known techniques, and it goes without saying that these configurations can be modified, such as by omitting a part of a configuration, without departing from the scope of the present invention.

INDUSTRIAL APPLICABILITY

As described above, the present invention is useful as a train-running management device that can suppress delay propagation of the train arrival time that can occur in the manner of a chain reaction in the group of subsequent trains.

REFERENCE SIGNS LIST 1 train-running management device, 10 ground running control unit, 11 running-performance input unit, 12 time-table input unit, 13 normal-running availability determination unit, 14 subsequent-train approach determination unit, 15 running-pattern calculation unit, running-pattern output unit, 17 storage unit, 19 communication device.

The invention claimed is:

1. A train-running management device that comprises a ground running control unit to transmit a running pattern, or information contributing to generation of the running pattern, to a control-target train, wherein
in a case where a first running pattern when the control-target train runs without being affected by a preceding train and a subsequent train is divided into an acceleration section where a train accelerates, and deceleration section where a train decelerates, and an intermediate section between the acceleration section and the deceleration section and in a case where a speed in the intermediate section is a first speed, when the ground running control unit determines that the control-target train affects a subsequent train, the ground running control unit changes the first running pattern to be indicated to the control-target train to execute running control such that a speed of the control-target train in the acceleration section becomes higher than the first speed and a speed of the control-target train in the intermediate section becomes lower than the first speed.

2. The train-running management device according to claim 1, wherein the ground running control unit executes running control of the control-target train such that, after a speed of the control-target train in the intermediate section becomes lower than the first speed, a speed of the control-target train in the intermediate section or the deceleration section becomes higher than the first speed so as to cause a running pattern of the control-target train extending over the acceleration section, the intermediate section, and the deceleration section to have an inverse S shape.

3. The train-running management device according to claim 1, wherein the ground running control unit transmits, to the control-target train, at least two pieces of limiting speed information as the information contributing to generation of the running pattern.

* * * * *